(12) United States Patent
Nordstrom et al.

(10) Patent No.: US 8,188,616 B2
(45) Date of Patent: May 29, 2012

(54) DC-DC POWER CONVERTER AND CONTROL METHOD

(75) Inventors: Erik Charles Nordstrom, Troy, MI (US); Mohammad N. Anwar, Van Buren Township, MI (US); David P. Tasky, Farmington Hills, MI (US); Alan G. Holmes, Clarkston, MI (US); Mehrdad Teimorzadeh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 12/732,510

(22) Filed: Mar. 26, 2010

(65) Prior Publication Data
US 2011/0233995 A1    Sep. 29, 2011

(51) Int. Cl.
*B60L 1/00* (2006.01)
*B60L 3/00* (2006.01)
*H02G 3/00* (2006.01)
(52) U.S. Cl. ..................................... 307/10.1
(58) Field of Classification Search ............ 307/9.1, 307/10.1; 180/65.21
See application file for complete search history.

(56) References Cited

U.S. PATENT DOCUMENTS
7,057,376 B2 *   6/2006   Cook et al. .................... 323/207
* cited by examiner

*Primary Examiner* — Jared Fureman
*Assistant Examiner* — Carlos Amaya
(74) *Attorney, Agent, or Firm* — Quinn Law Group, PLLC

(57) ABSTRACT

A vehicle includes a high-voltage (HV) energy storage system (ESS), an HV power bus, a DC-DC power converter electrically connected to the HV power bus, an HV bus connector, a low voltage (LV) battery power bus, and a pair of LV bus connectors. The vehicle includes a vehicle module electrically connected to the HV and LV bus connectors, an LV power bus electrically connected to the DC-DC power converter and to the module, and a controller. The controller has an algorithm that controls the converter to power the module via one of the LV bus connectors during a transient LV condition. The converter and a method of controlling the same are also provided, with the method including determining the LV condition, powering the vehicle module via one of the LV bus connectors during the transient LV condition, and powering the module via the other LV connector otherwise.

17 Claims, 2 Drawing Sheets

US 8,188,616 B2

DC-DC POWER CONVERTER AND CONTROL METHOD

TECHNICAL FIELD

The present invention relates to an apparatus and method for supplying low-voltage power aboard a vehicle during a transient low-voltage condition.

BACKGROUND OF THE INVENTION

One method of reducing vehicle fuel consumption is to selectively shut down the engine when engine output torque is not required, such as when the vehicle is temporarily parked at a stop light or idling in heavy traffic. Power delivered by an engine-driven generator to onboard low-voltage (LV) loads is discontinued when the engine is off. Therefore, LV loads are typically supplied by a 12-volt battery, another LV power source, and/or an LV battery/standard vehicle power bus.

Various onboard control modules are used to ensure proper vehicle functionality and control. Such modules may include a Traction Power Inverter Module or TPIM adapted for inverting direct current (DC) power to alternating current (AC) power and vice versa, a Vehicle Integration Control Module or VICM adapted for supplying power to a set of high-voltage (HV) battery relays or contactors, i.e., for HV contactor control, engine controllers, Vehicle Braking Modules, Vehicle Steering Modules, etc. Some or all of these vehicle modules may automatically reset whenever a voltage level on the standard vehicle power bus drops below a minimum threshold voltage.

SUMMARY OF THE INVENTION

Accordingly, a vehicle is provided herein that includes an engine, a high-voltage (HV) energy storage system (ESS), an HV power bus electrically connected to the ESS, a low-voltage (LV) battery power bus, and a DC-DC power converter electrically connected to the HV power bus. The DC-DC converter has an HV bus connector and a pair of different LV bus connectors, i.e., a power feed from the LV battery power bus and an independent buffered supply, thus supplying redundant LV power. Additionally, the vehicle includes one or more vehicle modules each electrically connected to the different LV bus connectors of the DC-DC converter, with the LV battery power bus being electrically connected to the DC-DC power converter and the vehicle module(s). Aboard the vehicle, a controller having a power flow control algorithm controls the DC-DC power converter. In particular, the controller powers the vehicle module(s) via the different LV bus connectors during a predetermined transient LV condition.

A DC-DC power converter is also provided for a vehicle having an HV ESS, an HV power bus, an LV battery power bus, and a vehicle module that is electrically connected to the DC-DC power converter. The converter includes HV and LV bus connectors as noted above, and powers the vehicle module(s) via a different LV feed during the transient LV condition, and via the other LV connector when the predetermined transient LV condition is no longer present.

A method is also provided for controlling a DC-DC power converter aboard a vehicle having an HV ESS, an HV power bus, an LV battery power bus, and a vehicle module that is electrically connected to the converter. The method includes determining the presence of a predetermined transient LV condition aboard the vehicle, powering the vehicle module with LV via one of a pair of LV bus connectors during the transient LV condition, and powering the vehicle module via the other LV bus connector when the transient LV condition is no longer present.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
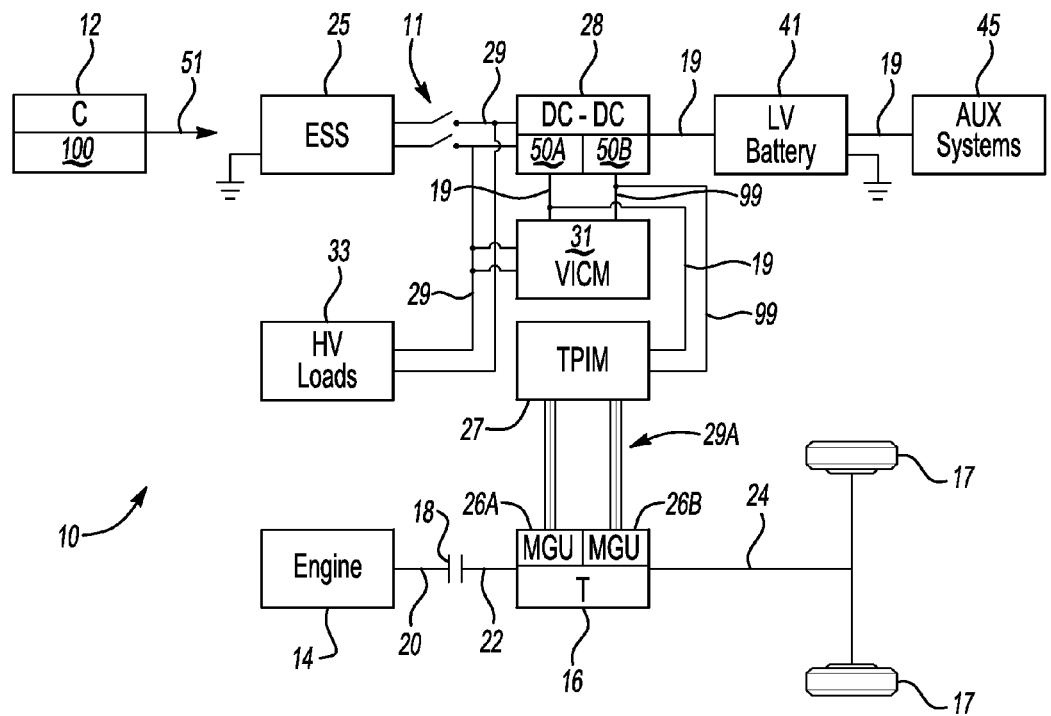
FIG. 1 is a schematic illustration of a vehicle having a DC-DC power converter, and a controller adapted for controlling an operation of the DC-DC power converter.

Referring to the drawings, wherein like reference numbers correspond to like or similar components throughout the several figures, FIG. 1 shows a vehicle 10. The vehicle 10 may be configured as any vehicle having a secondary power source, including but not limited to a hybrid electric vehicle (HEV). The vehicle 10 includes an internal combustion engine (E) 14 having an output member 20. The vehicle 10 also includes a transmission (T) 16 having an input member 22 and an output member 24. Output member 20 of engine 14 may be selectively connected to the input member 22 of the transmission 16 via a clutch 18. The transmission 16 may be configured as an electrically-variable transmission or any other suitable transmission capable of transmitting torque to wheels 17 via the output member 24.

The vehicle 10 includes a top-level controller (C) 12 having a power flow control algorithm 100, which is described in detail below with reference to FIG. 4. The controller 12 is adapted for controlling power flow aboard the vehicle 10, and in particular for coordinating, via a DC-DC power converter 28, a secondary LV power output or bus connector independently of the main functionality of the converter, and that allows dedicated power feeds to be routed to designated vehicle control modules. Power may be routed to these modules during a predetermined transient LV condition, e.g., a cold engine cranking and starting event according to one possible embodiment.

The vehicle 10 also includes at least one HV electric motor/generator unit (MGU), e.g., a multi-phase electric machine of approximately 60 volts to approximately 300 volts or more depending on the vehicle design. In the embodiment shown in FIG. 1, the vehicle 10 is configured as a two-mode HEV having first and second MGUs, i.e., MGU 26A and 26B, respectively. Each MGU is electrically connected to an HV DC power bus 29 via an HV alternating current (AC) power bus 29A, a Traction Power Inverter Module (TPIM) 27, i.e., a control module adapted for inverting DC power to AC power and vice versa as needed, and a Vehicle Integration Control Module (VICM) 31, i.e., a control module adapted for supplying power to HV battery contactors 11. The vehicle 10 includes an HV energy storage system (ESS) 25, e.g., a rechargeable battery, that may be selectively recharged using the MGUs 26A and/or 26B when the MGUs are operating as generators, for example by capturing energy during a regenerative braking event.

As understood by those of ordinary skill in the art, cranking and starting of an engine exerts a substantial, albeit a transient, LV electrical load on the onboard power supplies, thus causing an auxiliary voltage level aboard the vehicle 10 to rapidly drop. The reduced LV level may be sustained for as long as 100 milliseconds after initiation of the cranking and starting event. Such an LV level could cause the TPIM 27 and/or the VICM 31, or other vehicle modules or HV loads 33, to automatically reset as noted above, with a temporary loss of their respective functionalities.

Still referring to FIG. 1, the DC-DC power converter 28 is electrically connected to the HV ESS 25 via the HV power bus 29. Converter 28 is also electrically connected to an auxiliary battery 41, e.g., a 12-volt DC battery, via an LV battery power bus 19, referred to also as an LV bus for simplicity, ultimately energizing one or more LV auxiliary systems 45, e.g., windshield wipers, radio, seat warmers, etc. Converter 28 includes internal LV bus connectors 50A, 50B, which are connected in parallel without the possibility of back-feeding, as is understood in the art, and which feed the LV bus 19, i.e., the standard bus, and an independent buffered LV supply 99. LV supply 99 provides a fixed voltage that can power designated vehicle modules via the DC-DC power converter 28.

As noted above, the designated vehicle modules may include, according to one possible embodiment, the TPIM 27 and/or the VICM 31, with other vehicle modules being usable with the DC-DC power converter 28 depending on the design of vehicle 10. Converter 28 may be configured as either or both of a step-down/buck converter and a step-up/boost converter. Converter 28 provides redundant LV power to the designated vehicle modules via the LV bus connectors 50A, 50B, LV power bus 19, and LV supply 99, respectively. Hardware and software complexity, as well as buck circuit-related power loss, may be sufficiently reduced by removing LV boost circuitry that would otherwise be required.

Controller 12 may be configured as a single or a distributed control device that is electrically connected to or otherwise in hard-wired or wireless communication with each of the engine 14, the MGUs 26A and 26B, the ESS 25, the DC-DC converter 28, the TPIM 27, the VICM 31, and auxiliary battery 41 via one or more control channels (arrow 51). Control channels 51 may include any required transfer conductors, e.g., a hard-wired or wireless control link(s) or path(s) suitable for transmitting and receiving the necessary electrical control signals for proper power flow control and coordination aboard the vehicle 10. The controller 12 may include such modules and capabilities as might be necessary to execute all required power flow control functionality aboard the vehicle 10 in the desired manner.

The controller 12 may be configured as a general purpose digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the controller 12 or accessible thereby, including the algorithm 100 in accordance with the invention as described below with reference to FIG. 4, may be stored in ROM and executed by the controller 12 to provide the respective functionality.

Figure 2:
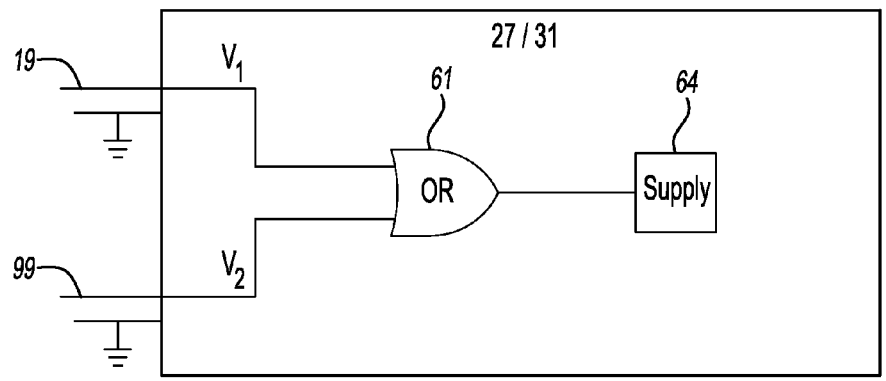
FIG. 2 is a schematic electric logic diagram for a vehicle module usable with the vehicle shown in FIG. 1.

Referring to FIG. 2, the designated vehicle module to be supplied with LV power is represented as the TPIM 27 or the VICM 31. Internally, the voltage connections are identical, and therefore the actual vehicle module may vary without departing from the intended inventive scope. The vehicle module is supplied via LV bus connectors 50A, 50B, which selectively powers the module via the LV bus 19 and the redundant LV power supply 99, respectively. A first voltage level ($V_1$) is present via LV connector 50A and LV bus 19, while a second voltage level ($V_2$) is present on LV bus connector 50B and supply 99. Voltages ($V_1$, $V_2$) may be comparatively processed by an OR gate 61 or other suitable logic. Gate 61 feeds the designated vehicle module(s) power supply 64. Gate 61 may be configured to ensure that the voltage from one of the LV bus connectors 50A, 50B feeds designated vehicle module(s) power supply 64 with at least a threshold voltage level.

Figures 3, 4:
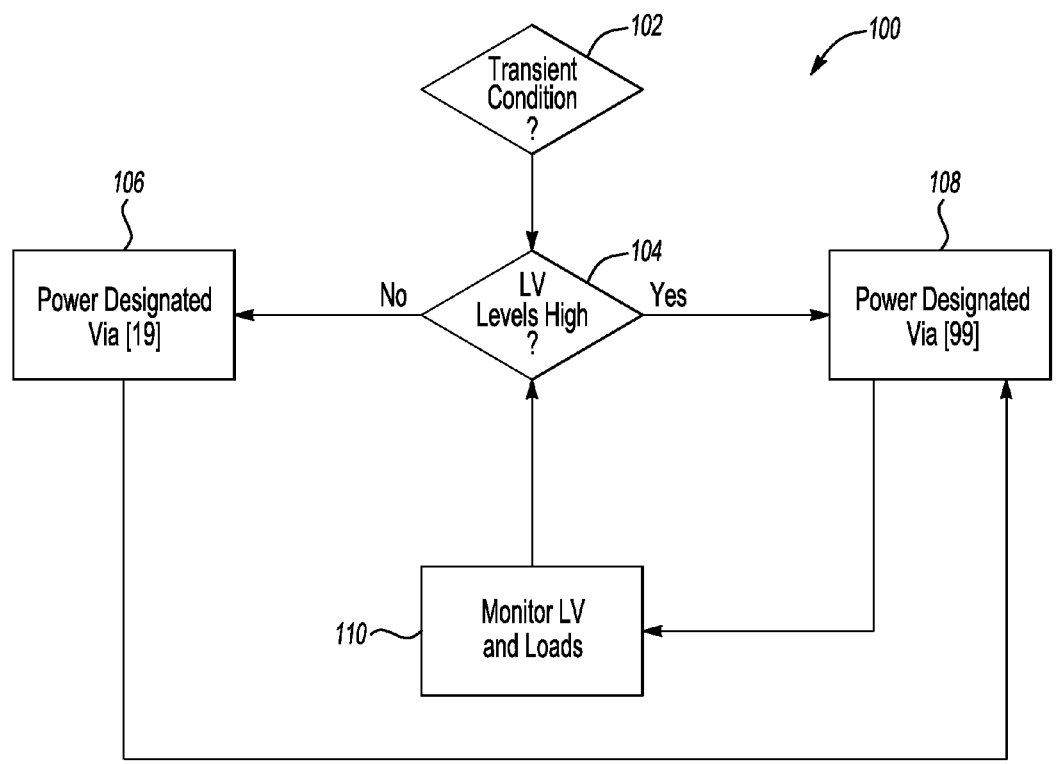
FIG. 3 is a table describing possible low-voltage levels for the vehicle modules of the vehicle shown in FIG. 1.
FIG. 4 is a flow chart describing an algorithm for controlling the DC-DC power converter aboard the vehicle shown in FIG. 1.

Referring to FIG. 3, a voltage table 70 shows possible values for $V_1$ and $V_2$ on LV power bus 19 and supply 99 respectively, as shown in FIG. 2. For example, if $V_1$ is 4.5 VDC and $V_2$ is 13.0 VDC, with a threshold of 9.0 VDC, the designated vehicle module(s) power supply 64 may be fed by $V_2$ and LV supply 99, i.e., a fixed 13.0 VDC supply in one embodiment, up to approximately 16.0 VDC in another embodiment. If $V_1$ on LV power bus 19 is 13.8 VDC and $V_2$ on supply 99 is any other value, the designated vehicle module(s) power supply 64 may be fed by $V_1$, i.e., by LV bus connector 50A connecting to the LV power bus 19 reducing the DC-DC conversion losses.

Referring to FIG. 4 in conjunction with the vehicle 10 shown in FIG. 1, the algorithm 100 begins at step 102, wherein a predetermined transient LV condition is detected. For example, if the engine 14 is cranked and started, the algorithm 100 proceeds to step 104, otherwise repeating in a loop until the transient LV condition is detected.

At step 104, the algorithm 100 determines whether the LV levels to the designated vehicle module(s) are sufficiently high. If so, the algorithm 100 proceeds to step 108. If not, the algorithm 100 proceeds to step 106.

At step 106, LV power is designated via the LV power bus 19 via bus connector 50A. The algorithm 100 then proceeds to step 110.

At step 108, the LV bus connector 50B of DC-DC power converter 28 powers the designated vehicle module, e.g., the TPIM 27 or VICM 31 in one embodiment, via LV power supply 99. The algorithm 100 then proceeds to step 110.

At step 110, LV voltages and other LV loads are continuously monitored, with the algorithm periodically repeating step 104 to determine if there has been a change.

Using the algorithm 100, the DC-DC power converter 28 can output a voltage in the range of approximately 9.0 VDC to approximately 16.0 VDC, and with a nominal output of approximately 13.8 VDC, to any designated modules, using the LV power bus 19 and supply 99. If the HV level on the HV power bus 29 drops below a threshold, as may be determined by the lower limit of the operating range of the DC-DC power converter 28, the LV bus connector 50A allows the LV power bus 19 to supply substantially all of the power needed to sustain the designated vehicle modules on the LV power bus alone. The LV bus connectors 50A, 50B may be adapted to use forward bias/reverse bias diode properties in order to turn the converter 28 on and off as needed to selectively feed the designated vehicle modules, or to connect the modules to the LV power bus 19.

Throughout execution of algorithm 100, the designated vehicle modules can monitor the voltage on the LV power bus 19, i.e., the standard vehicle bus voltage, on the anode-side of the LV bus connectors 50A, 50B, thus verifying and providing feedback that the DC-DC power converter 28 is still providing a voltage output to these modules, and that the standard LV bus voltage is still available. DC-DC converter 28 thus provides an independent feed to designated vehicle modules, such that the LV levels on the LV bus 99 are not pulled down if the DC-DC converter 28 fails to provide power to the LV power bus 19 and a transient event occurs.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a high-voltage (HV) energy storage system (ESS);
   an HV power bus that is electrically connected to the ESS;
   a low-voltage (LV) power bus;
   a DC-DC power converter that is electrically connected to the LV power bus and to the HV power bus, and that has an HV bus connector and a pair of low voltage (LV) bus connectors;
   a vehicle module that is electrically connected to each of two sets of LV bus connectors; and
   a controller having a power flow control algorithm adapted for controlling an operation of the DC-DC power converter;
   wherein the controller selectively powers the vehicle module via one of the pair of LV bus connectors during a predetermined transient LV condition to ensure a threshold supply of LV power to the vehicle module, and via the LV power bus when the predetermined transient LV condition is no longer present.

2. The vehicle of claim 1, further comprising an engine, wherein the transient LV condition is a voltage drop occurring during a cranking and starting of the engine.

3. The vehicle of claim 2, wherein the transient LV condition occurs when a voltage level supplied to the vehicle module drops below approximately 9.0 VDC.

4. The vehicle of claim 1, wherein the vehicle module includes one of a Traction Power Inverter Module and a Vehicle Integration Control Module.

5. The vehicle of claim 1, wherein at least one of the pair of LV bus connectors provides a fixed voltage level of approximately 12.0 VDC.

6. The vehicle of claim 1, wherein the transient LV condition is a voltage drop occurring during a vehicle engine cranking and starting event, wherein the algorithm is adapted for controlling the DC-DC converter such that the HV power bus supplies power to the DC-DC converter when vehicle ignition is detected, and wherein the DC-DC converter outputs a calibrated voltage to the vehicle module.

7. The vehicle of claim 6, wherein the algorithm is adapted for controlling the DC-DC converter such that if a voltage level drops below a threshold minimum output voltage of the DC-DC power converter, substantially all of the power needed by the vehicle module is provided via one of the pair of LV bus connectors.

8. A DC-DC power converter for a vehicle having a high-voltage (HV) energy storage system (ESS), an HV power bus, a vehicle module that is electrically connected to the DC-DC power converter, and a low-voltage (LV) power bus, the DC-DC power converter comprising:
   an HV bus connector; and
   a pair of LV bus connectors each providing an LV power supply;
   wherein the DC-DC power converter is adapted for powering the vehicle module via one of the pair of LV bus connectors, including: via the HV power bus during a predetermined transient LV condition aboard the vehicle to ensure a threshold supply of LV power to the vehicle module, and via the LV power bus when the predetermined transient LV condition is no longer present.

9. The DC-DC power converter of claim 8, wherein the transient LV condition occurs when a voltage level supplied to the vehicle module drops below approximately 9.0 VDC.

10. The DC-DC power converter of claim 8, wherein the vehicle module is configured as one of a Traction Power Inverter Module and a Vehicle Integration Control Module.

11. The DC-DC power converter of claim 8, wherein the pair of LV bus connectors provides a fixed voltage level of approximately 12.0 VDC.

12. The DC-DC power converter of claim 8, wherein the transient LV condition is a voltage drop occurring during a vehicle engine cranking and starting event, wherein the HV power bus supplies power to the DC-DC power converter when vehicle ignition is detected, and wherein the DC-DC power converter outputs a calibrated voltage to the vehicle module.

13. The DC-DC power converter of claim 12, wherein one of the pair of LV bus connectors provides substantially all of the power needed by the vehicle module if the voltage level of the HV power bus drops below a threshold minimum output voltage of the DC-DC power converter.

14. A method of controlling a DC-DC power converter aboard a vehicle having a high-voltage (HV) energy storage system (ESS), an HV power bus, a vehicle module that is electrically connected to the DC-DC power converter, and a low-voltage (LV) power bus, the method comprising:
   determining the presence of a predetermined transient LV condition aboard the vehicle;
   powering the vehicle module via one of a pair of LV bus connectors of the DC-DC power converter during the transient LV condition to ensure a threshold supply of LV power to the vehicle module; and
   powering the vehicle module via the other one of the pair LV bus connectors of the DC-DC power converter when the transient LV condition is no longer present.

15. The method of claim 14, wherein the predetermined transient LV condition is a voltage drop occurring during a cranking and starting of an engine of the vehicle.

16. The method of claim 14, wherein the vehicle module includes one of a Traction Power Inverter Module and a Vehicle Integration Control Module.

17. The method of claim 14, further comprising:
   controlling the DC-DC power converter such that if the voltage level of the HV power bus drops below a threshold minimum output voltage of the DC-DC power converter, the pair of LV bus connectors are controlled to supply substantially all of the power needed by the vehicle module.

* * * * *